Aug. 26, 1958  C. L. MORSE  2,848,822
EDUCATIONAL TOY FOR DEMONSTRATING
THE OPERATION OF THE SIPHON
Filed Sept. 26, 1955  2 Sheets-Sheet 2
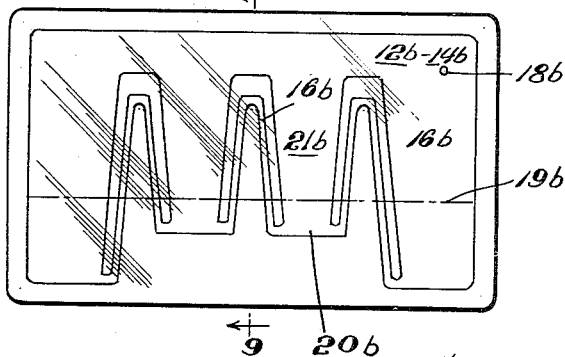
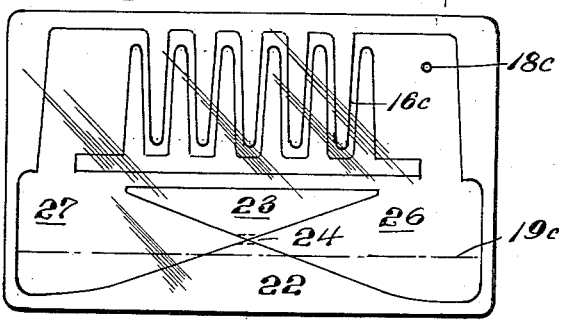
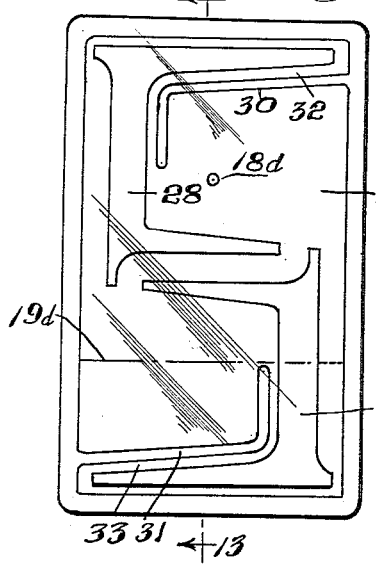
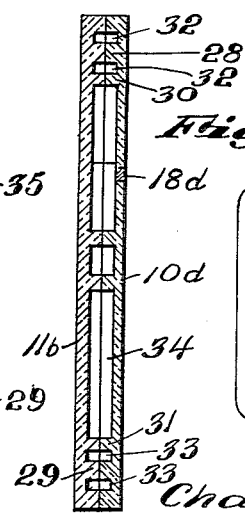
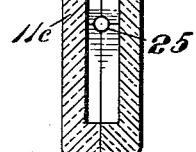
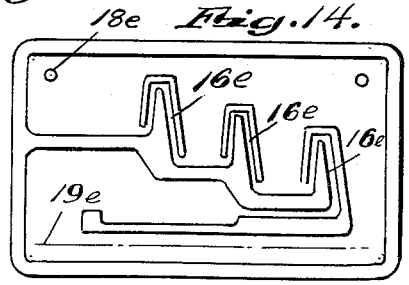
INVENTOR.
Charles L. Morse
BY
Barlow & Barlow
ATTORNEYS.

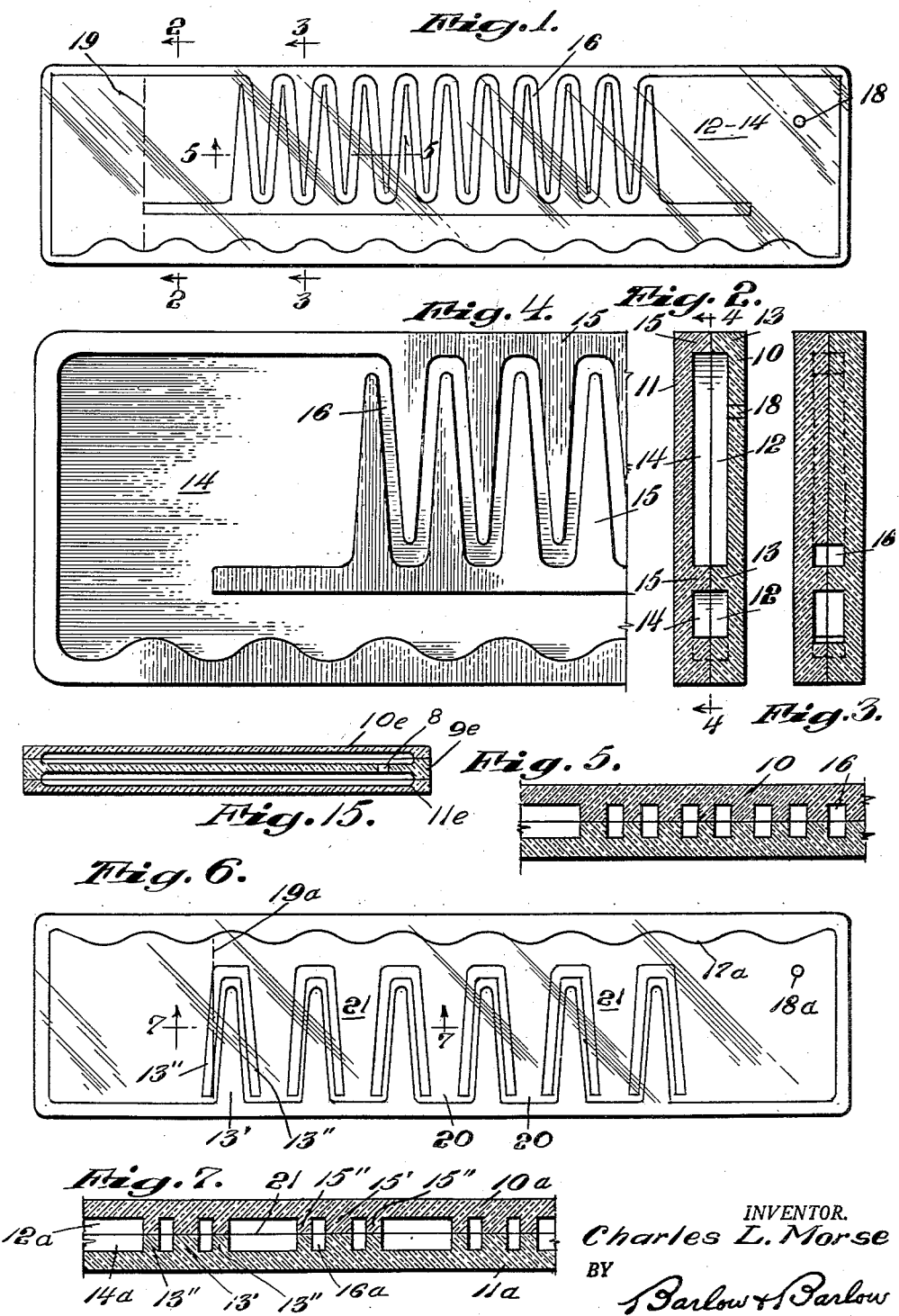

United States Patent Office 2,848,822
Patented Aug. 26, 1958

2,848,822
EDUCATIONAL TOY FOR DEMONSTRATING THE OPERATION OF THE SIPHON

Charles L. Morse, South Dartmouth, Mass.

Application September 26, 1955, Serial No. 536,627

6 Claims. (Cl. 35—19)

This invention relates to an educational toy and more specifically to a toy in the form of a complete enclosure in which water is adapted to be diverted into various channels to produce a pleasing as well as educational effects.

Educational devices may take many forms and produce a variety of effects. Some of the devices are rather complicated, involving great skill in assembly, and it is therefore one of the objects of this invention to provide a device which is extremely simple to construct and assemble.

A more specific object of the invention is to provide a device which may be molded from a synthetic material so as to form voids and passageways therein which may be filled with a colored liquid, the article being tilted so that the liquid will flow through the various voids and passageways to seek its own level.

A still further object of the invention is the provision of a device which is extremely durable and which will last through normal use by children of all ages.

With these and other objects in view, the invention consists of certain novel features of construction as will be more fully described and particularly pointed out in the appended claims.

In the drawings:

Figure 1 is a plan view of one form of the invention;

Figure 2 is a sectional view taken on lines 2—2 of Figure 1;

Figure 3 is a sectional view taken on lines 3—3 of Figure 1;

Figure 4 is a sectional view taken on lines 4—4 of Figure 2, showing a portion of the device in Figure 1;

Figure 5 is a sectional view taken on lines 5—5 of Figure 1;

Figure 6 is a plan view of another form of the invention;

Figure 7 is a sectional view taken on lines 7—7 of Figure 6;

Figure 8 is a plan view of still another form of the invention;

Figure 9 is a sectional view taken on lines 9—9 of Figure 8;

Figure 10 is a plan view of still another form of the invention;

Figure 11 is a sectional view taken on lines 11—11 of Figure 10;

Figure 12 is a plan view of a still further form of the invention;

Figure 13 is a sectional view taken on lines 13—13 of Figure 12;

Figure 14 is a plan view of an unsymmetrical form of the invention; and

Figure 15 is a sectional view of two forms of the invention placed one upon the other.

In proceeding with this invention, I preferably mold or otherwise form from two pieces of a synthetic material two halves of the toy body which are adapted to be placed together. These two halves may be symmetrical about a certain axis which varies in the several embodiments shown so that when the two halves are placed together, they will form a plurality of cavities or voids and channels therein. I form a suitable entrance hole into one of the voids and fill the two bodies which have previously been cemented together with a liquid, preferably colored, to a certain level and then seal the hole. With the choice of a proper liquid level, it will become readily apparent that as the body of the toy is tipped, the liquid will tend to flow to the lower level and create a certain pleasing and educational effect.

Referring now to the drawings and more particularly Figures 1 to 4, I have shown therein one embodiment of the invention. The device consists generally of a top 10 and a bottom 11, the designation "top" and "bottom" being purely arbitrary, as in use there is no normal position to the device. The top 10 and bottom 11 are identical in outline shape so that when placed one on top of the other, they will form an object which will have greater thickness or height, as the case may be. Each of the pieces 10 and 11 has been suitably shaped on one surface thereof so as to form a particular design, the other surface being smooth. This design is created, for instance in the top portion 10, by forming therein certain walls or voids which as a group are designated 12 and leaving certain land portions which as a group are designated 13. An identical treatment is performed on the bottom member 11, leaving similar voids 14 and lands 15.

In the embodiment of Figures 1 to 4 there is shown an arrangement whereby a generally sinuous channel 16 has been formed in the top and bottom portions. Additionally, an undulated portion 17 made up entirely of land portions 13 and 15 has been formed at one edge of the general voids 12, 14. It will be apparent that the top and bottom members are made symmetrical in the present embodiment through a median longitudinal axis in a single plane so that the top and bottom may be brought together as shown in Figures 2 and 3 to form the voids and passageways referred to. When the material used is a synthetic plastic, various solvents may be utilized to soften the surface which is to be joined. In certain cases, however, it may be desirable to use a special adhesive, the choice of joining the top and bottom portions 10 and 11 being determined by the choice of material used. A hole 18 has been shown through the top member 10 communicating with the voids 12, 14. This hole is utilized for filling the voids once the parts 10 and 11 have been assembled together, the hole being subsequently plugged off by a suitable means. It is preferred that the voids be filled to a certain level with a colored liquid, the level being sufficient in the embodiment of Figures 1 to 4 so that when the toy is inverted from the position shown in Figures 1 and 4 and one end is elevated higher than the other, there will be enough liquid present to flow through the sinuous passageways 16. A suggested level is represented by the dashed line 19 with the toy standing on its end.

In Figures 6 and 7 I have shown another embodiment of the invention, which in many respects is similar to that shown in Figures 1 to 4, like reference numerals identifying like parts. In this embodiment the top and bottom sections 10a and 11a are made in the same manner as that in the previous embodiment. Voids have been formed to make a discontinuous channel 16a in distinction to the continuous channel 16 of Figures 1 to 4. It will be seen by referring to Figure 6 that channel 16a is broken at locations designated 20. The lands 13', 15' project laterally from one edge, while lands of inverted U-shape 13'', 15'' are spaced therefrom. It will be apparent therefore that when liquid is inserted into the voids of this embodiment through opening 18a to the level 19a and as the article is tipped from the general horizontal position as shown in Figure 6, liquid will flow from one end of the body to the other through the passageway 16a. However, upon each excursion of the liquid through an individual passageway 16a, the intermediate portion void 21 will fill to the natural level until it reaches the top of the passageway 16a, thus creating a series of siphon actions as the liquid passes from one end of the body to another.

A still further extension of this idea is shown in Figures 8 and 9, in which three passageways 16b have been formed in the assembled body with a discontinuous portion 20b. In this embodiment, as in the other two, liquid may be filled into the general void 12b, 14b through the hole 18b to a level 19b, and when the body is tilted from the horizontal position as shown in the drawings, the liquid will tend to flow up in the passageway 16b, seeking its own level, and thence into the free void portion 21b and on down through the succeeding passageways 16b to the other end of the body.

The embodiment of Figures 10 and 11 is designed to show two educational functions, namely, that of a siphon and of an hour glass. To this end, there is formed voids and land areas to provide a continuous passageway in the form of a sine curve as shown in Figure 10 and designated 16c. To demonstrate the hour glass and orifice function, two triangular shaped land portions 22, 23 are formed in the top and bottom portions 10c and 11c (Figure 11) with the apexes of the triangles meeting at a point 24. At this point a hole is formed through the apex of the two triangular shaped portions designated 25. It will be apparent from examining Figures 10 and 11 that the device here shown is symmetrical about the section lines 11—11. Liquid may be placed in this embodiment to the suggested level 19c. When the device is oriented in a vertical plane, as shown in the drawing, it will be apparent that upon tipping the device, the liquid that has once been placed in the void area 26 will flow to the void area 27 at a rate determined by the size of the orifice 25. When in the inverted position of Figure 10, also on a vertical plane, the liquid that is filled into the voids of the body will traverse through the passageway 16c in the manner as described in connection with Figures 1 to 4.

Figures 12 and 13 illustrate a still further embodiment, in which the top 10d and bottom 11d are formed with land areas 28 and 29 that simulate the shape of a beaker. Narrow land areas 30, 31 extend close to one edge of this beaker and part way along the bottom thereof to form a passageway 32, 33, respectively. These passageways 32, 33 are continued over the top edge of the beaker and down along the outside edge thereof at the bottom thereof so as to form a communication path between the bottom of the beaker and the outside thereof into void areas generally designated 34 and 35. As in the previous embodiments liquid is filled to a predetermined level 19d within the voids when the device has been cemented together as described above.

Assuming for the sake of discussion that the beaker defined by the land areas 29 is filled with liquid approximately half way and that the device is tilted clockwise as viewed in the drawing, it will then be apparent that the filled passageway 33 will serve as a siphon, liquid passing therethrough from the void 34 into the void area 35 until the liquid level in the void area 35 assumes the same level as that in the void area 34 which may be considered in the beaker defined by the land area 29. It will thus be seen that this device illustrates in a rather forceful manner the operation of the siphon, which is often demonstrated in a laboratory through the use of a beaker and interconnecting piping.

Figure 14 shows still another form of the device in which a plurality of discontinuous channels 16e are formed in a step pattern that in many respects is similar to Figures 6–9. The main distinction herein is that less tilting of the toy is necessary to effect the siphon action. It will also be noted that there is no axial symmetry as is the case in the previous embodiment. A preferred liquid level is shown by line 19e.

Figure 15 shows the toy formed of three sections, a top 10e, a bottom 11e, and a mid-section 9e. In this configuration one design may be presented between the top and mid-section, while a different design is presented between the bottom and mid-section. The separate sections may have different colored liquids or a single liquid with interconnecting hole 8.

It is to be understood that the illustrations are purely representative of many possible arrangements of channels and voids, and it will be readily appreciated that the sections may be compartmented and channeled in a manner similar to the drawings with separate parallel channels through which various colored liquids might flow.

I claim:

1. An educational toy comprising a pair of transparent generally flat bodies secured together, said bodies having a plurality of voids on the mating surface thereof connected together by conduit means, a quantity of liquid in said toy, said liquid adapted to flow from one void area to another through said conduit means, said conduit means describing a continuous sinuous path.

2. An educational toy comprising a pair of transparent generally flat bodies secured together, said bodies having a plurality of voids on the mating surface thereof connected together by conduit means, a quantity of liquid in said toy, said liquid adapted to flow from one void area to another through said conduit means, at least one of said voids being outlined in the shape of a beaker and said conduit means describing a path from the bottom of said beaker up around one edge thereof to another void.

3. An educational toy comprising a transparent generally flat body having a plurality of void areas connected together by conduit means, a quantity of liquid in said void areas, said liquid adapted to flow from one void area to another through said conduit means, said conduit means describing a continuous sinuous path.

4. An educational device comprising a transparent generally flat hollow body having a first plurality of walls dividing a portion of the cavity of said body into a plurality of separate void areas, a second plurality of walls spaced from each other a distance less than the distance of the spacing of the first said walls dividing the remaining portion of said cavity into conduit means, said conduit means connecting said void areas one with the other, and a quantity of liquid in said body, said liquid adapted to flow from one void area to the other through said conduit means said conduit means being continuous from one void area to the other and describing a generally U-shaped path.

5. An educational device comprising a transparent generally flat hollow body having a first plurality of walls dividing a portion of the cavity of said body into a plurality of separate void areas, a second plurality of walls spaced from each other a distance less than the distance of the spacing of the first said walls dividing the remaining portion of said cavity into conduit means, said conduit means connecting said void areas one with the other and describing a continuous sinuous path, and a quantity of liquid in said body, said liquid adapted to flow from one void area to the other through said conduit means.

6. An educational device comprising a transparent generally flat hollow body having a first plurality of walls dividing a portion of the cavity of said body into a plurality of separate void areas, a second plurality of walls spaced from each other a distance less than the distance of the spacing of the first said walls dividing the remaining portion of said cavity into conduit means, said conduit means connecting said void areas one with the other and describing a continuous zig-zag path, and a quantity of liquid in said body, said liquid adapted to flow from one void area to the other through said conduit means.

References Cited in the file of this patent

UNITED STATES PATENTS

| | | |
|---|---|---|
| 449,748 | Roberts | Apr. 7, 1891 |
| 2,515,171 | Abel | July 18, 1950 |
| 2,714,260 | Burckhardt | Aug. 2, 1955 |